Patented Mar. 10, 1953

2,631,167

UNITED STATES PATENT OFFICE 2,631,167

METHOD OF REDUCING NITRO COMPOUNDS

Jesse Werner, Brooklyn, N. Y., assignor to General Aniline & Film Corporation, New York, N. Y., a corporation of Delaware No Drawing. Application March 3, 1950, Serial No. 147,573

6 Claims. (Cl. 260—575)

The present invention concerns an improved method of reducing nitro compounds and is particularly concerned with a method of reducing nitro compounds which contain a halogen in ortho- or para-position to the nitro group.

In those nitro compounds which contain a halogen in ortho- or para-position to the nitro group, the halo group is very labile chemically. Therefore, reductions using conventional methods are unsatisfactory since the reduction is either extremely slow or the halo group is replaced. Thus, reductions using alkali cannot be used since in such reductions, the halo group is, to an extent, replaced by a hydroxyl group. Reductions using hydrosulfides, sulfides and polysulfides cause a replacement of the halogen atom by a mercapto group, a sulfide group or a disulfide group. Reductions using sulfites or bisulfites cause some replacement of the halo group by a sulfo group. Reductions using metals, such as iron, zinc or aluminum, and acids are suitable for some of these compounds, but in the case of high-melting, insoluble compounds are too slow and give yields that are too low for commercial use, probably due in part to by-reactions caused by the structure of the nitro group. In United States Patent No. 1,919,580, there is disclosed a method of preparing 2-chloro-5-amino-1,4-dimethoxy benzene by reducing the corresponding nitro compound with iron and a small amount of hydrochloric acid. This reduction is, however, extremely slow and the amine must be extracted from the iron oxide sludge by means of organic solvents and the process therefore is not satisfactory on a technical scale.

I have now discovered that nitro compounds having a halogen in ortho- or para-position to the nitro group can readily be reduced on a commercial scale and with good yields by treating such nitro compounds with sodium hydrosulfite (by the term "sodium hydrosulfite" as used in the present specification and claims, is meant the compound "$Na_2S_2O_4$" sometimes also called "sodium hyposulfite") in the presence of water and a tertiary aromatic amine such as dimethyl aniline or diethyl aniline and preferably a tertiary ring nitrogen base, such as pyridine, picoline, quinoline and quinaldine. A technical compound is obtained which may be purified by any suitable means such as recrystallization, reprecipitation from solution in acid, vacuum distillation, etc.

The details of the present invention will be apparent to those skilled in the art from a consideration of the following examples which illustrate the same; the parts are by weight.

Example 1

To 175 parts 2-chloro-5-nitro-1,4-dimethoxy benzene, add 880 parts pyridine and then add slowly a solution of 400 parts sodium hydrosulfite dissolved in 1600 parts of water. The temperature rises to 60–65° C. Heat to 94–95° C. and keep at this temperature for 3 hours. Distill off 1400 parts of pyridine and water, add 1600 parts of water, cool to 25° C., stir for ½ hours at 25° C., filter, wash with 4000 parts of water, and dry the residue. A yield of about 120 parts of technical 2-chloro-5-amino-1,4-dimethoxy benzene is obtained. On recrystallization from alcohol, the product shows a melting point of 118–119° C. and a purity of over 99% when determined by titration with sodium nitrite in acid solution.

Example 2

To 620 parts picoline and 865 parts water, add 130 parts 2-chloro-5-nitro-1,4-dimethoxy benzene, and add 280 parts sodium hydrosulfite in ½ to 1 hour. The temperature rises to 55–65° C. Heat to reflux and reflux for 3 hours. Distill off 1000 parts of picoline and water and add 1200 parts of water. Cool to 25–30° C., filter, wash with 1200 parts of water, and dry the residue at 70° C. About 90 parts of technical 2-chloro-5-amino-1,4-dimethoxy benzene are obtained. On recrystallization from alcohol, results similar to those given in Example 1 are obtained.

In place of pyridine and picoline I have also used similar amounts of quinoline, quinaldine, dimethyl aniline and diethyl aniline in successfully carrying out the procedure described in the foregoing examples. Due to their higher boiling points of these last mentioned tertiary aromatic amines, the reaction was carried out at a temperature of 120–150° C. and the tertiary amines were removed by steam distillation on completion of the reaction rather than by straight distillation. Since steam distillation was employed it was not necessary to add water to the reaction product prior to the first filtration following the removal of the tertiary amine. Therefore, while pyridine and picoline are preferred aromatic tertiary amines for use in the process of this invention, the process is operable with other tertiary aromatic amines with only minor modifications which will be apparent to those skilled in the art.

While the foregoing examples illustrate a preferred method of practicing the present invention, various modifications therein will suggest themselves to those skilled in the art. While the process of the present invention is broadly applicable to the reduction of aromatic nitro compounds, the conventional methods of reduction are, in general, satisfactory with nitro compounds which are unsubstituted in ortho- or para-position to a nitro group or which bear a relatively stable substituent in such position. In the case, however, of nitro compounds having a halogen in ortho- or para-position to the nitro group and which is therefore very labile chemically, such as o-nitrochlorobenzene and p-nitrochlorobenzene, and particularly those compounds of this type which are relatively insoluble and have a high melting point, the process of the present invention may be used to good advantage.

The process of the present invention therefor is of particular advantage and is especially applicable to the reduction of mono nitro halogenated benzines having a halogen in one of the positions ortho- and para- to the nitro group as a class. As examples of compounds of this latter type to which the present process has been applied advantageously, may be mentioned o-nitrochlorobenzene, p-nitrochlorobenzene, o-(3-chloro-4-nitrobenzoyl) benzoic acid; 3-nitro-4-chloro N-butyl benzenesulfonamide; 3-nitro-4-chloro N,N-diethyl benzenesulfonamide; 5-nitro-1,2,4-trichlorobenzene.

The temperature employed for the reaction is not highly critical and, in general, temperatures of 100° to 160° C. are employed and the reflux temperature for the reaction mixture may be employed advantageously when pyridine or picoline are employed as the aromatic tertiary amine. The relative proportions of the reagents employed in the reduction may be varied through a relatively wide range, some excess of sodium hydrosulfite being employed, and the amounts of aromatic tertiary amine and water employed should be at least equivalent to the nitro compound and preferably in the range of from one to eight parts of aromatic tertiary amine and from two to ten parts of water to each part of nitro compound.

This application is a continuation in part of my co-pending application Serial No. 631,777, filed November 29, 1945.

I claim:

1. The method of reducing mononitrohalogenated benzenes having a halogen in one of the positions ortho- and para- to the nitro group, which comprises treating such nitro compounds with sodium hydrosulfite in the presence of at least equivalent amounts thereof of water and an aromatic tertiary amine base, wherein the tertiary amino nitrogen is linked directly to a carbon atom which is part of the aromatic nucleus.

2. A method of reducing mononitro halogenated benzenes having a halogen in one of the positions, ortho- and para- to the nitro group, which comprises treating such nitro compounds with sodium hydrosulfite in the presence of at least equivalent amounts thereof of water and an aromatic tertiary amine selected from the group consisting of dimethylaniline, diethylaniline, pyridine, picoline, quinoline and quinaldine.

3. The method as defined in claim 2 wherein the aromatic tertiary amine specified is pyridine.

4. The method as defined in claim 3 wherein the mononitro halogenated benzene specified is 2-chloro-5-nitro-1,4-dimethoxy benzene.

5. The method as defined in claim 2 wherein the aromatic tertiary amine specified is picoline.

6. The method as defined in claim 5 wherein the mononitro halogenated benzene specified is 2-chloro-5-nitro-1,4-dimethoxy benzene.

JESSE WERNER.

REFERENCES CITED

The following references are of record in the file of this patent:

UNITED STATES PATENTS

| Number | Name | Date |
| --- | --- | --- |
| 1,395,238 | Arnot | Oct. 25, 1921 |
| 1,919,580 | Wagner et al. | July 25, 1933 |

OTHER REFERENCES

Conant: "The Chemistry of Organic Compounds," Rev. Ed. (1939), pp. 509 and 554.

Brady et al.: J. Chem. Soc., 1929, pp. 2264–2266.

Hacklh's "Chemical Dictionary," The Blackeston Co., Philadelphia, Pa., 3rd ed., 1944, page 781.

"The Condensed Chemical Dictionary," Reinhold Pub. Corp., New York, N. Y., 1942, 3rd ed., page 584.

Mellor: "Comprehensive Treatise on Inorganic and Theoretical Chemistry," Longmans, Green and Co., New York, N. Y., 1930, vol. 10, p. 267.